United States Patent [19]
Link et al.

[11] Patent Number: 5,876,155
[45] Date of Patent: Mar. 2, 1999

[54] METHOD OF ELIMINATING CHATTER IN PLUNGE CUTTING WITH CUTTERS AT DIFFERENT DIAMETERS AND DEPTHS

[75] Inventors: Gregory Link, Canton; Yefim Val, Troy; Jide Jin, W Bloomfield; Mariano Martin; Juhchin Yang, both of Ann Arbor, all of Mich.

[73] Assignee: Ford Global Technologies, Inc., Dearborn, Mich.

[21] Appl. No.: 856,779

[22] Filed: May 15, 1997

[51] Int. Cl.$^6$ ....................................... B23B 35/00
[52] U.S. Cl. ........................... 408/1 R; 76/108.1; 76/115; 408/83.5; 408/143; 408/224; 408/227; 409/132; 409/141
[58] Field of Search ..................... 408/83.5, 1 R, 408/143, 223, 224, 227; 409/131, 132, 141; 76/108.1, 115

[56] References Cited

U.S. PATENT DOCUMENTS

| | | |
|---|---|---|
| 1,882,690 | 11/1932 | Albertson . |
| 2,036,656 | 6/1936 | Stowell et al. . |
| 5,716,169 | 2/1998 | Schuerfeld ............................. 408/1 R |

FOREIGN PATENT DOCUMENTS 1678551  9/1991  U.S.S.R. ................................ 408/1 R

*Primary Examiner*—Steven C. Bishop
*Attorney, Agent, or Firm*—Joseph W. Malleck

[57] ABSTRACT

A method that eliminates or reduces chatter when plunge cutting with boring cutters at different diameters, different tool geometries, different chip loads and different cutting depths, by computing optimal cutting insert locations and relocating such inserts to such optimal cutting locations with different phase angles therebetween; this minimizes the resultant radial force of the combined cutters. The method comprises (a) circumferentially stationing the cutters on the tool at different diameters and depths, but at first phase angle locations; (b) measuring or predicting the maximum radial and tangential cutting forces and chip loads imposed upon each cutter for each revolution of the tool, and repeating such calculation for all revolutions of the tool to acquire force information; (c) computing the different resultant radial forces that result from different phase angle positions for the inserts based on the force information; and (d) selecting the best combination of phase angles that produces a minimal/maximal resultant radial force and relocating the cutters according to such newly selected phase angles for completing plunge cutting.

9 Claims, 4 Drawing Sheets

METHOD OF ELIMINATING CHATTER IN PLUNGE CUTTING WITH CUTTERS AT DIFFERENT DIAMETERS AND DEPTHS

BACKGROUND OF THE INVENTION

1. Technical Field

This invention relates to the technology of eliminating chatter in the boring of metals, and more particularly to avoiding chatter resulting from the inter-action of several cutting elements on a single tool that produce different cutting forces in the metal chip removal process, the cutting elements each being at a different cutting diameter and depth, often referred to as plunge cutting.

2. Description Of The Prior Art

Chatter in a boring operation can make it difficult or impossible to meet surface finish requirements, can generate excessive vibration, and can cause premature tool failure through edge chipping. Assuming the boring apparatus itself is properly balanced (there being little or no forced vibration resulting from spindle imbalance, gear drive irregularities, or vibrations from adjacent tools, pumps or motors), the problem to be overcome is that of self-excited vibrations resulting from interaction of structural dynamics of the machine tool and the forces generated in the chip removal process.

The conventional approach is to symmetrically space the cutters for dynamic balance, and reduce chatter by changing the cutting speed, depth of cut, or width of cut per cutting insert. This is often fruitless if it increases the cutting force in a direction in which the machine tool or work piece lacks stiffness. In multi-diameter and multi-depth cutting tools, this conventional approach often leads to productivity decrease.

Chatter is of particular concern to the automotive industry when machining valve seats in an automotive cylinder head. There have been two attempts by the prior art to reduce chatter in "same-diameter" milling of valve seats using a plurality of cutters. In one, the cutting edges of a single insert are equally circumferentially spaced, but given a different cutting angle as a result of defining the edges about an eccentric axis (see U.S. Pat. No. 1,882,690). In the other, a large number of individual flat thin notched cutting blades are held in a head for same-diameter milling; the blades are spaced randomly irregularly about the rotating axis of the head. The randomness and irregular spacing promotes a smoother finish using notched blades so that they traverse randomly different cutting lines (see U.S. Pat. No. 2,036,656). Neither of these references provide a solution for eliminating chatter in plunge cutting using cutters at different diameters and depths.

SUMMARY OF THE INVENTION

The invention herein eliminates or reduces chatter when plunge cutting with boring cutters at different diameters, different tool geometries, different chip loads and different cutting depths, by computing optimal cutting insert locations and relocating such inserts to such optimal cutting locations with different phase angles therebetween; this minimizes the resultant radial force of the combined cutters.

More particularly the inventive method comprises the steps of: (a) circumferentially stationing the cutters on the tool at different diameters and depths, but at first phase angle locations; (b) measuring or predicting the maximum radial and tangential cutting forces and chip loads imposed upon each cutter for each revolution of the tool, and repeating for several revolutions of the tool to acquire resultant force information; (c) computing the different resultant radial force that result from different phase angle positions for the inserts based on the measured or predicted force information for all revolutions; and (d) selecting the best combination of phase angles that produce a minimal resultant force and relocating the cutters according to such newly selected phase angles for completing plunge cutting.

DETAILED DESCRIPTION AND BEST MODE

Figure 4:
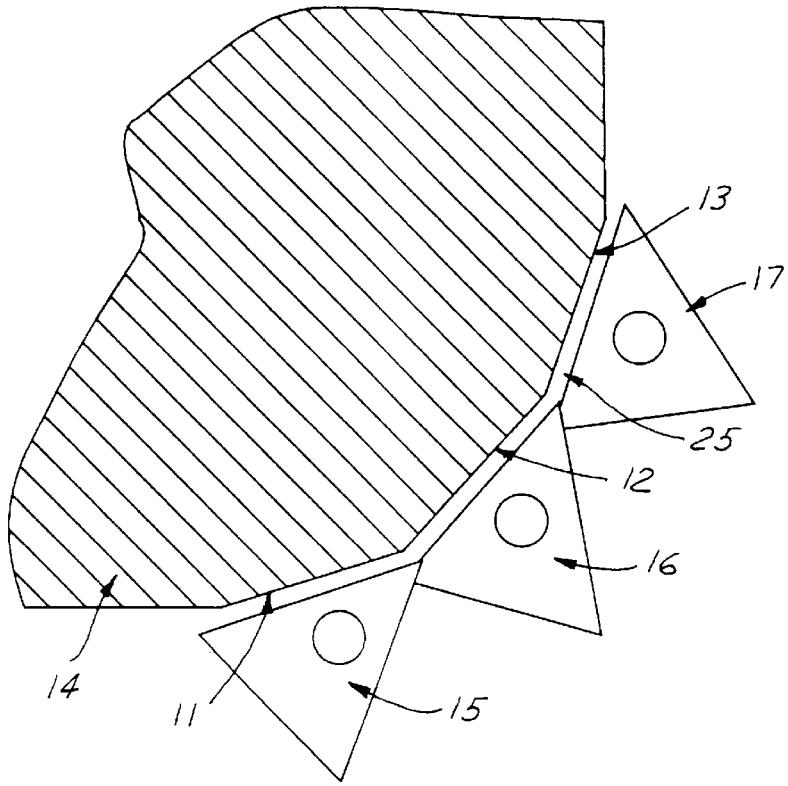
FIG. 4 is an enlarged schematic illustration of an exhaust valve seat showing the multiple surfaces to be finished by the plunge cutter tool and illustrating how each cutter is oriented to create such surfaces.

As shown in FIGS. 1–4, a plunge cutting tool 10 is used to create three different adjacent surfaces (11, 12, 13) for a valve seat 25 of an automotive engine cylinder head 14 in one thrust of the rotary tool, by use of cutters 15, 16, 17, carried at slightly different diameters 18 and different depths 19 to contact the valve seat 25 each in a different manner (as shown in FIG. 4). The cutting diameter is measured to the cutting edge 20 of each cutter; each cutter is held on a cartridge 21 which is received by the holder 22. The holder rotates about an axis 23 and is linearly thrust in the direction of the axis when carrying out plunge cutting. The holder is designed and constructed to hold cartridges at predetermined positions. Cutter inserts are indexable and adjustable. Each cutter has a macro geometry defined by the axial rake, radial rake and lead angles for most efficient removal of work piece material. In addition, cutters have a microgeometry of the cutting edge consisting of a T-land angle and width to strengthen the cutting edge and prolong tool life.

Figure 6A:
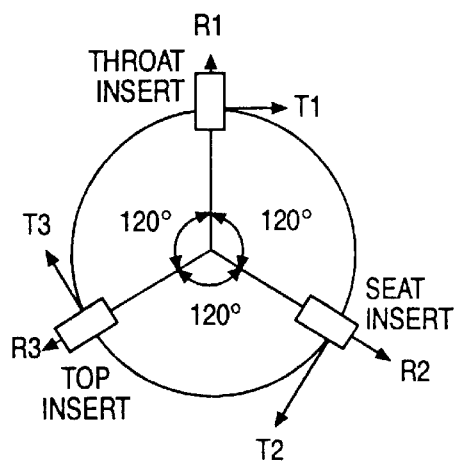
FIG. 6 is a composite computer graphic view of phase angles used conventionally and those that may be used by this invention for one application.

Proper cutter design is important in plunge machining operations, such as valve seat machining. Valve seats need to have a surface that is chatter free, smooth and round. When symmetrically spaced, such as suggested in FIG. 6a, the only way the cutters can be dynamically balanced about the axis 23 is if the cutters each create the same chip area and operate at the same diameter and depth. However, in plunge cutting, where each cutter must machine a different surface or shoulder at different angles and depths, the chip areas and cutting edge geometries will each be different, creating different radial and tangential forces both as to magnitude and directionality. The resultant force from all of these cutting forces can be high enough to initiate chatter and/or cause deflections which affect part quality.

Figure 1:
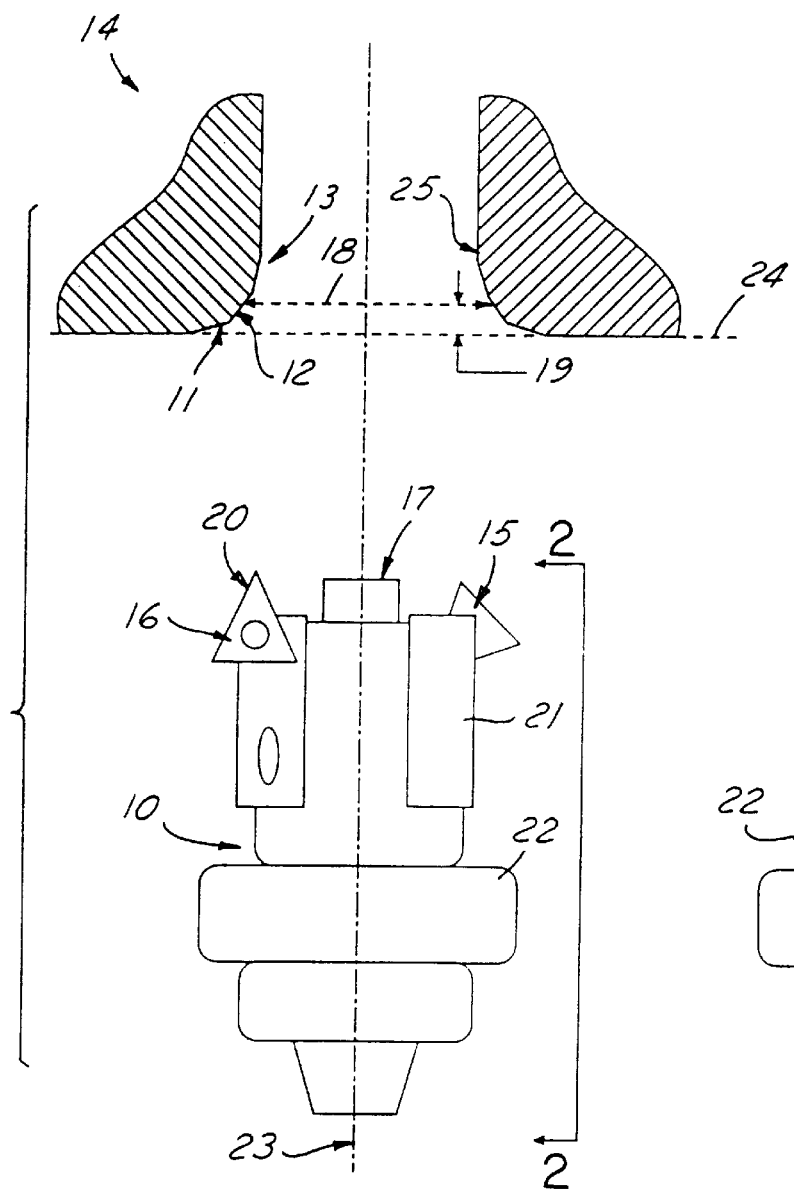
FIG. 1 is an elevation view of a rotary milling head tool used to carry out a finish plunge operation on an exhaust valve seat for an automotive engine head, the tool being constructed in accordance with the principles of this invention.
Figure 2:
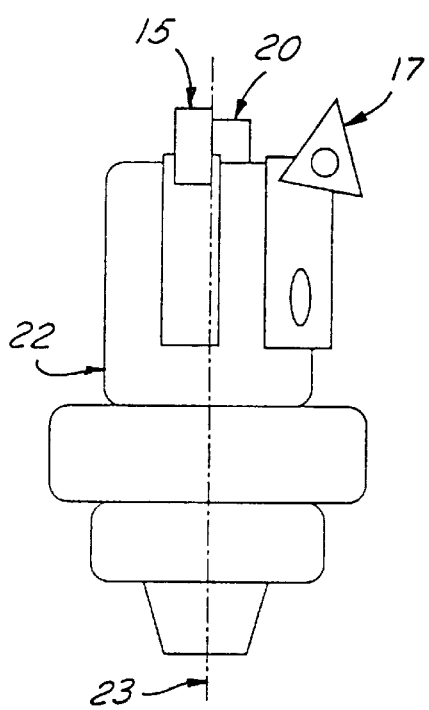
FIG. 2 is a side elevation view of FIG. 1 taken along line 2—2 thereof.
Figure 3:
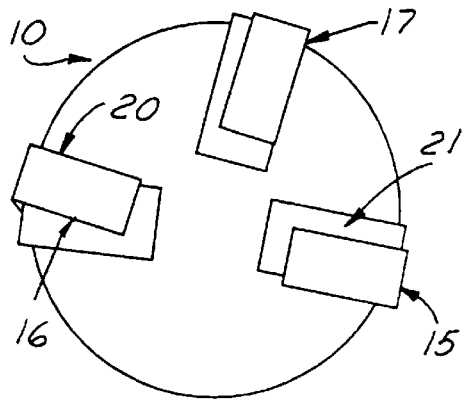
FIG. 3 is a top view of FIG. 1.
Figure 5:
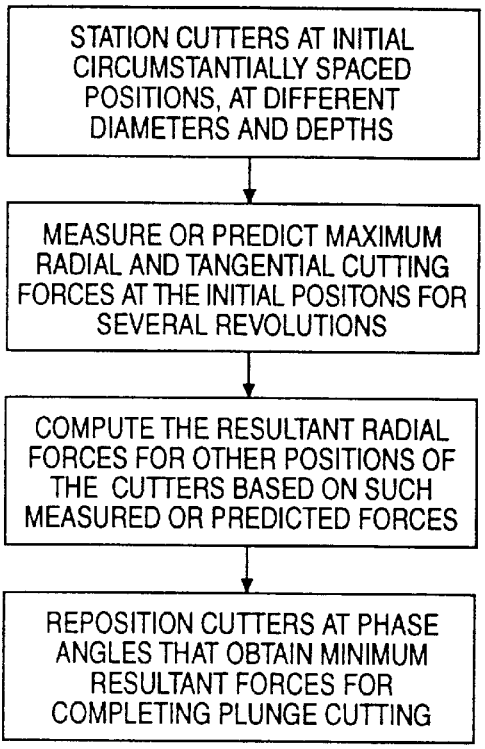
FIG. 5 is a block diagram of the process of this invention. phase

If the resultant force is minimized or reduced to a value below a threshold, chatter will be avoided. To achieve this, the method herein uses an analytical technique; as shown in FIG. 5 the cutters are first positioned at initial circumferentially spaced phase angles, for machining at different diameters 18 relative to the axis 23 and at different depths 19 relative to a transverse plane 24 of the workpiece. The analysis technique next requires the measurement or prediction of the maximum radial and tangential cutting forces imposed on each cutter for each revolution of the tool; accurate force information is crucial for a proper design. A typical force is about 200 lbs. The force magnitude changes for each revolution of the cutting head or tool 10. For example, the throat cutter insert 17 engages first with the valve seat 25; as the spindle carrying tool 10 moves linearly down as well as rotating, the second cutter (seat insert 16) engages the work piece or valve seat metal. Finally, all three of the cutters (including the top cutter insert 15) are brought into cutting contact with the work piece. It is assumed that the force magnitude is directly related to the chip load (defined herein to mean the uncut cross-sectional area of the chip times the force per it area to machine the workpiece material), which is determined by valve seat, tool geometry and cutting parameters. Based on this assumption, maximum radial and tangential cutting forces for each cutter are measured or predicted and the cutting forces for each revolution are proportionally calculated therefrom. Radial forces are those shown in FIG. 6 to be the force generated at the cutting edge 20 and directed radially out from the centerline 23 of the cutter and tangential forces are those defined to mean the force generated at the cutting edge 20 and directed at a tangent to the circular path of the cutter.

With this force information, computation is made of the resultant radial force that results from different phase angle positions for the cutter inserts. An optimization criterion is used to find the minimal resultant radial force from all the combination angles of the three cutters for all revolutions. Specifically, for each insert angle combination set, a "maximal radial residual force" is identified from all revolutions for it. The optimal angle combination will correspond to the minimal "maximal radial residual force" from all the insert angle combination sets. The mathematical expression for such criteria is written as:

$$\text{Min}[\text{Max } \{F_i(\theta_i, \theta_2)\}_i = 1, 2 \ldots n] \quad \theta_1 = 0°-360°$$
$$\theta_2 = 0°-360°$$

Where $\theta_1$ is the angle between the throat and seat cutters, $\theta_2$ is the angle between throat and top cutter inserts. $F_i(\theta_1 \theta_2)$ is the resultant radial force for $\theta_1$ and $\theta_2$ at each revolution i, i=1, 2, . . . , n; n is the total number of revolutions needed to complete a plunging operation, typically about 28. Theoretically, angles $\theta_1$ and $\theta_2$ can vary from 0° to 360°. Design constraints such as a minimal angle between any inserts can be taken into consideration by limiting the mathematical expression.

Such computation of the resultant radial force can be facilitated by appropriate software and a computerized program which embeds such mathematical rules to seek out the best combination of insert phase angles for the plunging tool. Such software will calculate the resultant radial forces for any set of angles.

Figure 6B:
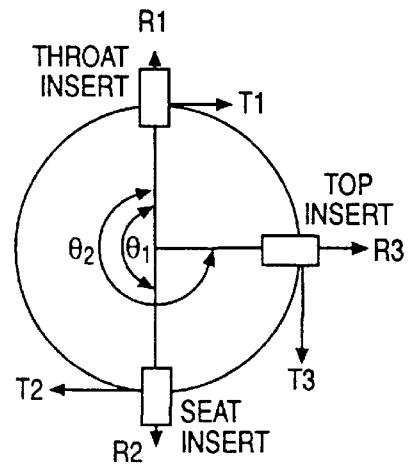
Figure 7:
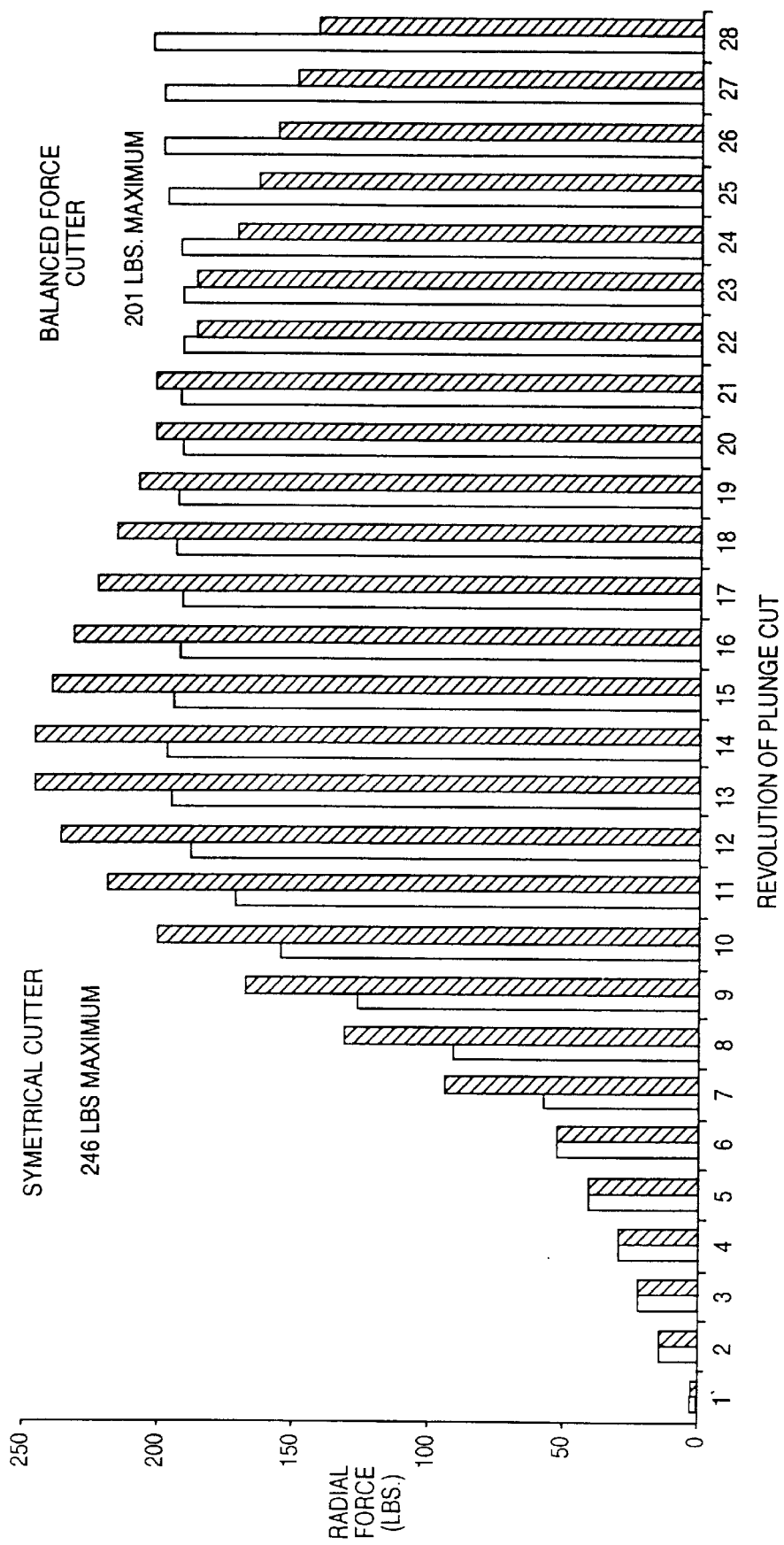
FIG. 7 is a graphical illustration showing the variation of radial forces as a function of revolutions for a plunge cutting tool, first with symmetrically spaced cutters and secondly with cutters arranged according to this invention.

Once the resultant forces for the phase angles are determined, the phase angles for the minimum resultant force can be selected and the cutters are relocated according to such new phase angles for completing the plunge cutting with the elimination of chatter. The phase angles may be that as shown in FIG 6(b). An example of the computations of the radial forces according to step (c) of the process is shown in FIG. 7. FIG. 7 compares the radial forces for symmetrically spaced plunge cutters (shown in the dark bar), and the radial forces for cutters spaced according to optimization analysis of this invention (light bars)so that the resultant radial forces is minimized to about 201 pounds maximum, whereas for the symmetrically spaced cutters the force is 246 pounds.

Figure 8:
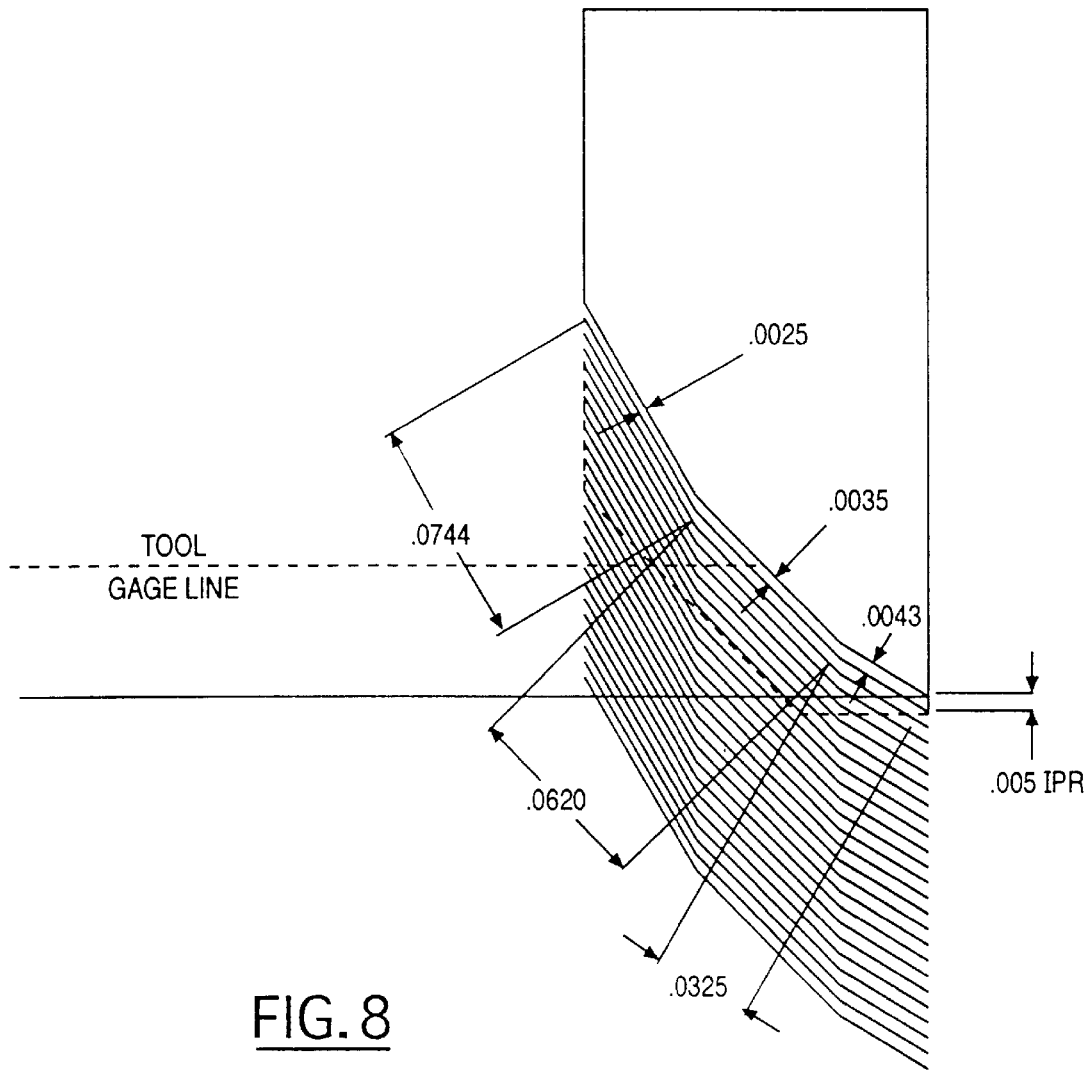
FIG. 8 is an illustration of chip loads for different cutters.

Thus, the input for the analytical tool comprises; (a) maximum cutting force and radial force (for both sharp and dull tools) obtained from test measurement or prediction; (b) chip area data for each cutter insert for every revolution (which are obtained from CAD models); and (c) restricting the phase angle between the cutter inserts if necessary due to cutter shape or size. The output from such analytical tool is (a) the phase angles for minimal or best possible resultant force, and (b) the maximal resultant force, average force, and standard deviation of the residual force for all the revolutions. The way in which chip load is calculated is based on valve seat geometry profile, insert geometry and orientation, tool layout and feed rate. An example of this chip load information is shown in FIG. 8.

To demonstrate the effectiveness of the method disclosed herein, three examples are demonstrated in Tables 1–6(c) to show the results. In a first example, the cutter inserts have sharp cutting edges and a geometry with a 45° T-land; the cutting forces are shown in Table 1. In Table 2, a comparison is made between symmetrically spaced cutters (original) and the balanced plunging tool design of this invention with respect to angles and forces. The critical factor for creating chatter is the maximum radial force at the spindle which was improved from 102 lbs to 83 lbs. or 18.6% in the balanced design of table 2. A second example was carried out wherein the same type of cutters were employed but the cutter edge preparation further included a circular grind of 0.010/0.015 inches. A circular grind is defined herein to mean 0/010–0.015 inches wide circular land ground on the cutters from the centerline 23 of the tool.

The cutting forces and conditions for the second example are shown in Table 3 and the comparison of the symmetrical vs the balanced tool design of this invention is shown in Table 4. Finally, a third example compares sharp and dull cutter inserts to explore any different force distributions that may result. It is recognized that the optimal design for a sharp tool is considered to be more critical than that with a dull tool for this case. Best resultant forces and phase angles for both sharp and dull tools are shown in Tables 6B and 6C. Table 6A shows the resultant forces for the conventional design. Actual cutting forces for each of these sharp and dull tools are listed in Table 5. It can be observed that the resultant force can be reduced by as much as 40% (103 lbs. To 61 lbs.) for a sharp tool. An added benefit in this case was an improvement in tool change frequency from 1500 to 2500 pieces per change. Similarly valve seat roundness was improved to such an extent that in-plant valve seat leaks were eliminated.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

TABLE 1

| Inserts | Radial Force (lbs.) | Tangential Force (lbs.) |
| --- | --- | --- |
| Throat Insert (20°) | 41 | 36 |
| Seat Insert (45°) | 83 | 86 |
| Top Insert (60°) | 30 | 44 |

TABLE 2

|  | Original Design | Balanced Design |
| --- | --- | --- |
| Angle between Throat and Seat Inserts | 240° | 180° |
| Angle between Throat and Top Inserts | 120° | 90° |
| Maximal Residual Radial Force | 102 lbs. | 83 lbs. |
| Average Residual Radial Force | 63 lbs. | 61 lbs. |
| Standard Deviation of Residual Forces | 32 lbs. | 32 lbs. |
| Revolution at which Maximal Force Occurs | 14th | 28th |

TABLE 3

| Inserts | Radial Force (lbs.) | Tangential Force (lbs.) |
| --- | --- | --- |
| Throat Insert (20°) | 205 | 61 |
| Seat Insert (45°) | 312 | 85 |
| Top Insert (60°) | 158 | 76 |

TABLE 4

|  | Original Design | Balanced Design |
| --- | --- | --- |
| Angle between Throat and Seat Inserts | 240° | 185° |
| Angle between Throat and Top Inserts | 120° | 95° |
| Maximal Residual Radial Force | 279 lbs. | 180 lbs. |
| Average Residual Radial Force | 169 lbs. | 122 lbs. |
| Standard Deviation of Residual Forces | 83 lbs. | 57 lbs. |
| Revolution at which Maximal Force Occurs | 13th | 13th |

TABLE 5

|  | Sharp Tool Force (lbs.) | | Dull Tool Force (lbs.) | |
| --- | --- | --- | --- | --- |
| Inserts | Radial Force | Tangential Force | Radial Force | Tangential Force |
| Throat Insert (20°) | 200 | 45 | 179 | 47 |
| Seat Insert (45°) | 131 | 86 | 180 | 125 |
| Top Insert (60°) | 65 | 85 | 165 | 88 |

TABLE 6-A

|  | Angle between Throat and Seat Inserts | Angle between Throat and Top Inserts | Maximal Residual Radial Force | Average Residual Radial Force | Standard Deviation of Residual Forces | Revolution at which Maximal Force Occurs |
| --- | --- | --- | --- | --- | --- | --- |
| Sharp Tool | 240° | 120° | 102 lbs. | 73 lbs. | 24 lbs. | 28 th |
| Dull Tool | 240° | 120° | 145 lbs. | 73 lbs. | 41 lbs. | 13 th |

TABLE 6-B

|  | Angle between Throat and Seat Inserts | Angle between Throat and Top Inserts | Maximal Residual Radial Force | Average Residual Radial Force | Standard Deviation of Residual Forces | Revolution at which Maximal Force Occurs |
| --- | --- | --- | --- | --- | --- | --- |
| Sharp Tool | 180° | 270° | 61 lbs. | 32 lbs. | 16 lbs. | 5 th |
| Dull Tool | ↓ | ↓ | 124 lbs. | 75 lbs. | 32 lbs. | 28 th |

TABLE 6-C

|  | Angle between Throat and Seat Inserts | Angle between Throat and Top Inserts | Maximal Residual Radial Force | Average Residual Radial Force | Standard Deviation of Residual Forces | Revolution at which Maximal Force Occurs |
| --- | --- | --- | --- | --- | --- | --- |
| Sharp Tool | ↑ | ↑ | 129 lbs. | 56 lbs. | 29 lbs. | 28 th |
| Dull Tool | 220° | 90° | 110 lbs. | 62 lbs. | 30 lbs. | 13 th |

We claim:

1. A method of plunge cutting a metallic valve seat by use of a rotary tool having a plurality of cutters that create different metal chip loads and reaction forces, comprising;

(a) circumferentially stationing said cutters on the tool at different diameters and depths, but at first phase angle locations;

(b) measuring or predicting actual maximum radial and tangential cutting forces and chip loads imposed on each cutter for each revolution of the tool, and repeating for several revolutions to acquire force information;

(c) computing the different resultant radial forces that result from different phase angle positions for the cutter inserts based on the force information for all revolutions; and (d) selecting the best combination of phase angles for minimal/maximal resultant radial force and relocate the cutter inserts according to such selected phase angles for completing plunge cutting.

2. The method as in claim 1, in which step (c) is carried out by an analysis comprising the equation $$\mathrm{Min}[\mathrm{Max}\,\{F_i(\theta_1,\theta_2)\}_i = 1,2\ldots n] \quad \theta_1 = 0°\text{--}360°$$
$$\theta_2 = 0°\text{--}360°.$$

3. The method as in claim 1, in which step (b) is carried out by empirical testing using cutting force dynamometers.

4. The method as in claim 1, in which said tool has a plurality of at least 3 cutters generating different metal chip loads, one for defining the throat surface, another for defining the primary seat surface and a third for defining a top chamfered surface, each of said surfaces being at a different angle and depth with respect to each other.

5. The method as in claim 1, in which each cutter has a tool geometry comprised of axial and radial angles up to 10° and a lead angle up to 90°, a tool composition selected from the group of tool steel, polycrystalline diamond, ceramic, cermets, cubic boron nitride (CBN) or carbides, and an edge sharpness or dullness characterized by the cutter edge preparation.

6. The method as in claim 5, in which said tool geometry is further characterized by a size diameter of ½ inch to 3 inches.

7. The method as in claim 5, in which the cutter has a T-land of up to 45°.

8. The method as in claim 1, in which the valve seat profile is of the type having 1 to 5 surfaces each at different angles and depths.

9. The method as in claim 1, in which said rotary tool is moved into engagement with the workpiece during plunge cutting at a feed rate of about 0.001 inch/rev. to 0.020 inch/rev.

* * * * *